(12) United States Patent
Yoshikawa et al.

(10) Patent No.: US 6,462,794 B1
(45) Date of Patent: Oct. 8, 2002

(54) IMAGE FORMING UNIT, ENLARGING UNIT, OPTICAL PARTS, AND IMAGE DISPLAY APPARATUS HAVING THESE COMPONENTS

(75) Inventors: Hiroki Yoshikawa; Tetsu Ohishi, both of Hiratsuka; Hideo Tanide, Fujisawa; Takesuke Maruyama, Yokohama; Goro Ohnishi, Machida; Takashi Iwata, Hadano; Takeshi Igarashi, Ayase, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/414,481

(22) Filed: Oct. 8, 1999

(30) Foreign Application Priority Data

Oct. 14, 1998 (JP) .................................... 10-292345
Nov. 17, 1998 (JP) .................................... 10-326787

(51) Int. Cl.$^7$ ............................................. G02F 1/1335
(52) U.S. Cl. ............................ 349/95; 359/621; 353/32
(58) Field of Search ........................ 349/95, 5, 15, 349/57; 359/455, 457, 621; 353/32

(56) References Cited

U.S. PATENT DOCUMENTS

| | | | | |
|---|---|---|---|---|
| 5,439,621 A | * | 8/1995 | Hoopman | 264/2.5 |
| 5,650,876 A | * | 7/1997 | Davies et al. | 359/622 |
| 5,703,717 A | * | 12/1997 | Ezra et al. | 359/462 |
| 5,844,715 A | * | 12/1998 | Park et al. | 359/457 |
| 6,124,974 A | * | 9/2000 | Burger | 359/621 |
| 6,133,687 A | * | 10/2000 | Clarke et al. | 313/718 |
| 6,271,965 B1 | * | 8/2001 | Miyata | 359/453 |
| 6,327,083 B1 | * | 12/2001 | Goldenberg et al. | 359/453 |

FOREIGN PATENT DOCUMENTS

| | | |
|---|---|---|
| JP | 6070601 | 4/1985 |
| JP | 6417017 | 1/1989 |
| JP | 6167673 | 6/1994 |
| JP | 996704 | 4/1997 |
| JP | 9274177 | 10/1997 |
| JP | 2810572 | 7/1998 |

OTHER PUBLICATIONS

"LCD Multi-Panel Display" by Fujitsu (1996) pp. 352-356.

* cited by examiner

*Primary Examiner*—Kenneth Parker
(74) *Attorney, Agent, or Firm*—Antonelli, Terry, Stout & Kraus, LLP

(57) ABSTRACT

An enlarging unit comprises a concave Fresnel lens warped convexly toward an image forming unit side, the image forming unit is held between a light transmissible support plate warped convexly toward the image forming unit side and the enlarging unit warped convexly toward the image forming unit side, and peripheries of the support plate and the enlarging unit are fixed or semi-fixed. Thereby, deformation caused when the incident side and emission side micro-lens arrays are molded and deformation due to environmental temperature and humidity change are corrected, and both components are always maintained in close contact.

34 Claims, 12 Drawing Sheets

ULTRAVIOLET RAY 33 34 35

36
38

IMAGE FORMING UNIT, ENLARGING UNIT, OPTICAL PARTS, AND IMAGE DISPLAY APPARATUS HAVING THESE COMPONENTS

BACKGROUND OF THE INVENTION

1. Field of the Invention

This invention relates to an image display apparatus provided with an liquid crystal display element and a back light for lighting the liquid crystal display element, and relates to an light image forming unit, and light enlarging unit, or optical parts which are components of the image display apparatus.

2. Description of the Related Art

With rapid progress of computers, recently the resolution of the image display apparatus has been improved rapidly and along with the size of the display screen has been increased.

Though the cathode ray tube type image display apparatus, which has been used conventionally, is excellent in resolution, the weight and power consumption increases in proportion to the resolution, and also price has risen. Because the large size display screen involves increased weight and depth, the degree of high resolution and size of display screen is naturally limited.

Significant progress has been conducted in the aspect of resolution of the liquid crystal display element type image display apparatus and the high resolution has been realized always in conformity with market needs, however not so rapid progress has been conducted in the aspect of size of display screen because the liquid crystal element is fabricated almost by mean of semiconductor process.

To realize the liquid crystal display element type large size display screen, various trials have been made. Among these trials, a method in which a small size display screen is enlarged and projected by use of a projection lens has been practically progressed particularly. However, this method requires a long projection distance. A large size display screen by means of the method loses the advantage of the liquid crystal display element, namely the advantage of thinness of the liquid crystal display element.

Some alternative methods in which liquid crystal panels are jointed without seam have been proposed. For example, Japanese Unexamined Patent Publication No. Hei 5-188340 discloses a method in which a liquid crystal panel is provided with an image forming unit and enlarging unit and the liquid crystal panel are enlarged only to the magnitude to cover the seam portion between adjacent liquid crystal panels. In this conventional method, the thinning is easy because the magnitude of enlargement is small. An image display apparatus associated with the present invention is described with reference to FIG. 23 and FIG. 24.

FIG. 23 is a plan view of an image display apparatus for covering the seam of liquid crystal panels, and FIG. 24 is a cress sectional view along the line A–A1 in FIG. 23. In FIG. 23 and FIG. 24, 51a and 51b denote transmission type liquid crystal display elements, 52 denotes a back light for lighting the above-mentioned liquid crystal display element, 53 denotes a cathode ray tube which is an component of the back light, 54 denotes a means for narrowing the divergent angle of output light of the back light, namely divergent angle control means, 55a and 55b denote image forming unit for projecting the display image (not shown in the drawing) on the liquid crystal display elements 51a and 51b to form an erect life-size real image(that is, erect real image having roughly same size in the embodiment), 56a and 56b denote enlarging units for enlarging the projected erect real image formed by 55a and 55b, 57 denotes a back side projection type screen, and 58 denotes a chassis for containing these parts therein.

Next, the operation of component parts is described. The back light 52 lights the transmission type liquid crystal display elements 51a and 51b with a light emitted from the cathode ray tube 53 which is a component of the back light 52. However the transmission type liquid crystal display element is disadvantageous in view angle characteristic and the contrast is inverted on the portion where the light is irradiated with an angle larger than a certain angle. To prevent the contrast inversion, the divergent angle control means 54 for narrowing the divergent angle of output light of the back light is provided between the back light 52 and the transmission type liquid crystal display elements 51a and 51b. As the divergent angle control means 54 for narrowing the divergent angle of the output light of the back light, a means in which the angle of light having the incident angle within a certain angle range is narrowed and the light having the incident angle exceeding the certain angle range is returned back so as not to be output light has been known. According to Fujitsu Giho (FUJITSU. 47, 4, (07, 1996), p355), the same effect is realized by arranging light transmissible cones. As the result, the display image displayed on the transmission type liquid crystal display elements 51a and 51b has a predetermined divergent angle. A display image displayed on the liquid crystal display elements 51a and 51b by use of image forming units 55a and 55b having an image taking angle larger than the divergent angle is projected to form an erect life-size image. The image forming units 55a and 55b are disclosed in, for example, Japanese Unexamined Patent Publication No. Sho 64-17017. In the application, the divergent angle control means is realized by a rod lens eye structure comprising many connected lenses, each connected lens comprises two lenses connected longitudinally. A display image projected by means of the image forming units 55a and 55b is enlarged by means of the enlarging units 56a and 56b, and an image is formed on the back projection type screen 57. As the enlarging units 56a and 56b, a concave Fresnel lens which are disclosed in, for example, Japanese Unexamined Patent Publication No. Hei 9-96704 may be used.

A plurality of projection units described herein above are arranged so that respective projection images are joined without seam on the back projection type screen 57 to thereby obtain a large size high resolution image.

However, rod lens eyes are used as the image forming units 55a and 55b in the conventional art described herein above, the image forming units 55a and 55b having a rod lens array is not only expensive but also not suitable for mass-production in association with the manufacturing process of rod lens arrays.

To solve the above-mentioned problem, a pair of micro-lens arrays disclosed in, for example, Japanese Unexamined Patent Publication No. Hei 9-274177 may be used because the micro-lens array can be easily mass-produced by means of die molding. However, manufacturing is involved in difficult problem because it is difficult to match the optical axis of the micro-lenses on the incident and emission surfaces of respective micro-lens array of a pair of micro-lens arrays and also it is difficult to match the optical axis of respective micro-lenses of two micro-lens arrays. Particularly in the case of a large size micro-lens array, it is required to fit a pair of micro-lens arrays on the entire surface, however a thin-walled large size molded product is apt to deform easily depending on the environmental humidity and temperature condition and large size micro-lens arrays can not be tightly fit invariantly.

Furthermore, the conventional art described herein above requires the narrow divergent angle of the output light from the back light 52. The output light of the cathode ray tube 53 which is an component of the back light 52 has significantly wide divergent angle, and the narrowing of the divergent angle causes serious reduction of the efficiency. Furthermore, the means 54 for narrowing the divergent angle of the output light of a back light having the above-mentioned arranged light transmissible cones has a large depth, therefore the means 54 causes the loss of the advantage of the liquid crystal display apparatus namely thin depth.

SUMMARY OF THE INVENTION

It is an object of the present invention to solve the above-mentioned problems and to provides a thin efficient image display apparatus and an image forming unit, an enlarging unit, or optical parts including these components which are components of the image display apparatus.

It is another object of the present invention to provide an image forming unit for correcting deformation due to molding, optical parts including the image forming unit, and a image display apparatus which uses the image forming unit.

It is yet another object of the present invention to provide an image forming unit, an enlarging unit, optical parts including the image forming unit, and an image display apparatus which uses the image forming unit which prevents stray light even though the divergent angle of the output light of the back light is large.

To achieve the purpose of the present invention, in the first invention, an image display apparatus comprises a transmission type liquid crystal display element, a back light for lighting the liquid crystal display element, optical parts including an image forming unit for projecting a display image (or display image information)on the liquid crystal display element, and a back projection type screen for displaying a projection image, wherein the optical parts comprises an incident side micro-lens array, a emission side micro-lens array, the first light transmissible plate warped convexly toward the incident side micro-lens array, and the second light transmissible plate warped convexly toward the emission side micro-lens array, and the incident side micro-lens array and the emission side micro-lens array are held between the first and second light transmissible plates and ends of these components are fixed or semi-fixed together.

In the first invention, peripheries of the incident side micro-lens array and the emission side micro-lens array are adhered together. Furthermore, peripheries of the incident side micro-lens array and the emission side micro-lens array are adhered together by means of any one of heat melting type film adhesive, photo-setting type adhesive, and ultrasonic melting adhesion.

In the first invention, the second light transmissible plate is an enlarging unit. The enlarging unit is preferably a concave Fresnel lens. The concave Fresnel lens is coated with moisture proofing material. The concave Fresnel lens consists of a material which is less moisture absorptive than polymethylmethacrylate resin. In the first invention, the concave Fresnel lens is disposed so that the Fresnel surface is in contact with the emission side micro-lens array. Projections having flat end are provided on the top of Fresnel of the concave Fresnel lens, and shading portions for shading are provided on each top of the projections. The size of the projections of the concave Fresnel lens is equal for all the projections, or the size of the projections may decrease gradually from the peripheral area to the center area. A light reduction filter is provided on the center area of the concave Fresnel lens where the projection is not provided.

In the first invention, a U-shaped adapter is provided, ends of the incident side micro-lens array, the emission side micro-lens array, the first light transmissible plate, and the second light transmissible plate are inserted into the space of the U-shaped adapter, tightened with both ends of the U-shaped adapter, and semi-fixed with the adapter. Otherwise, edges of the incident side micro-lens array, the emission side micro-lens array, and the first and second light transmissible plates are adhered, melting adhered, or pressure sensitively adhered. The plate thickness of the first light transmissible plate is preferably equal to that of the second light transmissible plate. The first and second light transmissible plates consist of the same material. The warping magnitude of the first and second light transmissible plates is preferably equal each other.

In the first invention, a stop array is provided between the incident side micro-lens array and the emission side micro-lens array. The stop array is a shading plate having a plurality of light passing portions. The incident side and emission side micro-lens arrays comprise lens groups respectively, the number of lens groups is approximately equal to the number of effective light passing portions of the stop array. The optical axes of the lens groups are coincident with the positions of the light passing portions. The diameter of the light passing portion provided on the stop array may be larger on the peripheral area than on the center area of the stop array. The coefficient of linear thermal expansion of the material of the stop array is approximately equal preferably to that of the material of the incident side and emission side micro-lens arrays. The material used for the stop array is photoresist material which is coated at least on one of the incident side micro-lens array and the emission side micro-lens array, and portions coincident with the optical axes of the lens groups are removed.

In the second invention, an image display apparatus comprises a transmission type liquid crystal display element, a back light for lighting the liquid crystal display element, optical parts including an image forming unit for projecting a display image(or display image information) on the liquid crystal display element, and a back projection type screen for displaying a projection image, wherein the optical parts comprises the image forming unit comprising an incident side micro-lens array and a emission side micro-lens array, an enlarging unit warped convexly toward the image forming unit side, and a light transmissible support plate warped convexly toward the image forming unit side, and the image forming unit is held between the enlarging unit warped convexly toward the image forming unit side and the light transmissible support plate warped convexly toward the image forming unit side and the peripheries of the enlarging unit and the light transmissible support plate are fixed or semi-fixed.

In the second invention, peripheries of the incident side micro-lens array and the emission side micro-lens array are adhered together. Peripheries of the incident side micro-lens array and the emission side micro-lens array are adhered together by means of any one of heat melting type film adhesive, photo-setting type adhesive, and ultrasonic melting adhesion.

In the second invention, the enlarging unit is a concave Fresnel lens. The concave Fresnel lens may be coated with moisture proofing material. The concave Fresnel lens consists of a material which is less moisture absorptive than polymethylmethacrylate resin. In the second invention, the concave Fresnel lens is disposed so that the Fresnel surface is in contact with the emission side micro-lens array. Projections having flat end are provided on the top of Fresnel of the concave Fresnel lens, and shading portions for shading are provided on each top of the projections. The size of the projections of the concave Fresnel lens is equal for all the projections, or the size of the projections may decrease gradually from the peripheral area to the center area. A light reduction filter is provided on the center area of the concave Fresnel lens where the projection is not provided.

In the second invention, a U-shaped adapter is provided, ends of the incident side micro-lens array, the emission side micro-lens array, the first light transmissible plate, and the second light transmissible plate are inserted into the space of the U-shaped adapter, tightened with both ends of the U-shaped adapter, and semi-fixed with the adapter. Otherwise, edges of the incident side micro-lens array, the emission side micro-lens array, the enlarging unit, and the light transmissible plate are adhered or pressure sensitively adhered. The plate thickness of the enlarging unit is approximately equal to that of the light transmissible support plate. The material of the enlarging unit may be the same as that of the light transmissible support plate. The warp magnitude of the enlarging unit is preferably approximately equal to that of the light transmissible support plate.

In the second invention, a stop array is provided between the incident side micro-lens array and the emission side micro-lens array. The stop array is a shading plate having a plurality of light passing portions. The incident side and emission side micro-lens arrays comprise lens groups respectively, the number of lens groups is approximately equal to the number of effective light passing portions of the stop array. The optical axes of the lens groups are preferably coincident with the positions of the light passing portions. The diameter of the light passing portion provided on the stop array may be larger on the peripheral area than on the center area of the stop array.

In the second invention, the coefficient of linear thermal expansion of the material of the stop array is approximately equal preferably to that of the material of the incident side and emission side micro-lens arrays. The material used for the stop array is photoresist material which is coated at least on one of the incident side micro-lens array and the emission side micro-lens array, and portions coincident with the optical axes of the lens groups are removed.

In the third invention, optical parts used for projecting a display image(or display image information) displayed on a liquid crystal display element on a screen by use of a back light for lighting the liquid crystal display element comprise an incident side micro-lens array, a emission side micro-lens array, the first light transmissible plate warped convexly toward the incident side micro-lens array side, and the second light transmissible plate warped convexly toward the emission side micro-lens array, wherein the incident side micro-lens array and the emission side micro-lens array are held between the first and second light transmissible plates, and edges of these components are fixed or semi-fixed.

In the third invention, peripheries of the incident side micro-lens array and the emission side micro-lens array are adhered together. Furthermore, the incident side micro-lens array and the emission side micro-lens array are adhered together at the edges of the incident side and the emission side micro-lens arrays by means of any one of heat melting type film adhesive, photo-setting type adhesive, and ultrasonic melting adhesion.

In the third invention, the second light transmissible plate is an enlarging unit. The enlarging unit is a concave Fresnel lens. The concave Fresnel lens is preferably coated with moisture proofing material. The concave Fresnel lens may consist of a material which is less moisture absorptive than polymethylmethacrylate resin.

In the third invention, the concave Fresnel lens is disposed so that the Fresnel surface is in contact with the emission side micro-lens array. Projections having flat end are provided on the top of Fresnel of the concave Fresnel lens, and shading portions for shading are provided on each top of the projections. The size of the projections of the concave Fresnel lens is equal for all the projections, or the size of the projections may decrease gradually from the peripheral area to the center area. A light reduction filter is provided on the center area of the concave Fresnel lens where the projection is not provided.

In the third invention, a U-shaped adapter is provided, ends of the incident side micro-lens array, the emission side micro-lens array, the first light transmissible plate, and the second light transmissible plate are inserted into the space of the U-shaped adapter, tightened with both ends of the U-shaped adapter, and semi-fixed with the adapter. Otherwise, edges of the incident side micro-lens array, the emission side micro-lens array, and the first and second light transmissible plates are adhered or pressure sensitively adhered.

Furthermore, the plate thickness of the first light transmissible plate is preferably equal to that of the second light transmissible plate. The first and second light transmissible plates consist of the same material. The warping magnitude of the first and second light transmissible plates is preferably equal each other.

In the third invention, a stop array is provided between the incident side micro-lens array and the emission side micro-lens array. The stop array is a shading plate having a plurality of light passing portions. The incident side and emission side micro-lens arrays comprise lens groups respectively, the number of lens groups is approximately equal to the number of effective light passing portions of the stop array. The optical axes of the lens groups are coincident with the positions of the light passing portions. The diameter of the light passing portion provided on the stop array may be larger on the peripheral area than on the center area of the stop array. The coefficient of linear thermal expansion of the material of the stop array is approximately equal preferably to that of the material of the incident side and emission side micro-lens arrays. The material used for the stop array is photoresist material which is coated at least on one of the incident side micro-lens array and the emission side micro-lens array, and portions coincident with the optical axes of the lens groups are removed.

In the fourth invention, optical parts used for projecting a display image(or display image information) displayed on a liquid crystal display element on a screen by use of a back light for lighting the liquid crystal display element comprise the image forming unit comprising an incident side micro-lens array and a emission side micro-lens array, an enlarging unit warped convexly toward the image forming unit side, and a light transmissible support plate warped convexly toward the image forming unit side, wherein the image forming unit is held between the enlarging unit warped convexly toward the image forming unit side and the light transmissible support plate warped convexly toward the image forming unit side, and the peripheries of the enlarging unit and the light transmissible support plate are fixed or semi-fixed.

In the fourth invention, the incident side micro-lens array and the emission side micro-lens array are adhered together at the peripheries of the incident side and emission side micro-lens arrays. Peripheries of the incident side micro-lens array and the emission side micro-lens array are adhered together by means of any one of heat melting type film adhesive, photo-setting type adhesive, and ultrasonic melting adhesion.

In the fourth invention, the enlarging unit is a concave Fresnel lens. The concave Fresnel lens may be coated with moisture proofing material. The concave Fresnel lens consists of a material which is less moisture absorptive than polymethylmethacrylate resin.

In the fourth invention, the concave Fresnel lens is disposed so that the Fresnel surface is in contact with the emission side micro-lens array. Projections having flat end are provided on the top of Fresnel of the concave Fresnel lens, and shading portions for shading are provided on each top of the projections. The size of the projections of the concave Fresnel lens is equal for all the projections, or the size of the projections may decrease gradually from the peripheral area to the center area. A light reduction filter is provided on the center area of the concave Fresnel lens where the projection is not provided.

In the fourth invention, a U-shaped adapter is provided, ends of the incident side micro-lens array, the emission side micro-lens array, the first light transmissible plate, and the second light transmissible plate are inserted into the space of the U-shaped adapter, tightened with both ends of the U-shaped adapter, and may be semi-fixed with the adapter. Otherwise, edges of the incident side micro-lens array, the emission side micro-lens array, the enlarging unit, and the light transmissible plate may be adhered or pressure sensitively adhered.

In the fourth invention, the plate thickness of the enlarging unit may be approximately equal to that of the light transmissible support plate. The material of the enlarging unit may be the same as that of the light transmissible support plate. The warp magnitude of the enlarging unit is preferably approximately equal to that of the light transmissible support plate.

In the fourth invention, a stop array is provided between the incident side micro-lens array and the emission side micro-lens array. The stop array is a shading plate having a plurality of light passing portions. The incident side and emission side micro-lens arrays comprise lens groups respectively, the number of lens groups may be approximately equal to the number of effective light passing portions of the stop array. The optical axes of the lens groups are preferably coincident with the positions of the light passing portions. The diameter of the light passing portion provided on the stop array may be larger on the peripheral area than on the center area of the stop array. The coefficient of linear thermal expansion of the material of the stop array is approximately equal preferably to that of the material of the incident side and emission side micro-lens arrays. The material used for the stop array is photoresist material which is coated at least on one of the incident side micro-lens array and the emission side micro-lens array, and portions coincident with the optical axes of the lens groups are removed.

In the fifth invention, peripheries of the incident side micro-lens array and the emission side micro-lens array are adhered by means of any one of heat melting type film adhesive, photo-setting type adhesive, or ultrasonic melting adhesion. A stop array may be provided between the incident side micro-lens array and the emission side micro-lens array. The stop array may be a shading plate having a plurality of light passing portions. The incident side and emission side micro-lens arrays comprise lens groups respectively, the number of lens groups may be approximately equal to the number of effective light passing portions of the stop array. The optical axes of the lens groups are preferably coincident with the positions of the light passing portions. The diameter of the light passing portion provided on the stop array may be larger on the peripheral area than on the center area of the stop array. The coefficient of linear thermal expansion of the material of the stop array may be approximately equal to that of the material of the incident side and emission side micro-lens arrays. The material used for the stop array is photoresist material which is coated at least on one of the incident side micro-lens array and the emission side micro-lens array, and portions coincident with the optical axes of the lens groups are removed.

In the sixth invention, an enlarging unit comprises a concave Fresnel lens having a Fresnel on the surface disposed facing on the incident side of an image forming unit.

In the sixth invention, the concave Fresnel lens is coated with moisture proofing material. The concave Fresnel lens consists of a material which is less moisture absorptive than polymethylmethacrylate resin.

In the sixth invention, projections are provided on the top of Fresnel of the concave Fresnel lens, and shading portions for shading are provided on each top of the projections. The size of the projections of the concave Fresnel lens is equal for all the projections. Otherwise, the size of the projections of the concave Fresnel lens may decrease gradually from the peripheral area to the center area. A light reduction filter is preferably provided on the center area of the concave Fresnel lens where the projection is not provided.

In the seventh invention, an image display apparatus comprises a transmission type liquid crystal display element, a back light for lighting said liquid crystal display element, optical parts including an image forming unit for projecting display image information(or a display image) on said liquid crystal display element, and a back projection type screen for displaying a projection image. Said optical parts comprises an incident side micro-lens array, a emission side micro-lens array, a first light transmissible plate having elasticity, and the second light transmissible plate having elasticity. Wherein said incident side micro-lens array and said emission side micro-lens array are held between said first and second light transmissible plates, and are elastically pressed by said first and second light transmissible plates.

In the eighth invention, an image display apparatus comprises a transmission type liquid crystal display element, a back light for lighting said liquid crystal display element, optical parts including an image forming unit for projecting display image information(or a display image) on said liquid crystal display element, and a back projection type screen for displaying a projection image. Said optical parts comprises said image forming unit comprising an incident side micro-lens array and a emission side micro-lens array, an enlarging unit having elasticity, and a light transmissible support plate having elasticity. Wherein said image forming unit is held between said enlarging unit and said light transmissible support plate, and is elastically pressed by said enlarging unit and said light transmissible support plate.

In the ninth invention, optical part is used for projecting display image information(or a display image) displayed on a liquid crystal display element on a screen by use of a back light for lighting said liquid crystal display element. Said optical parts comprises an incident side micro-lens array, a emission side micro-lens array, a first light transmissible plate having elasticity, and a second light transmissible plate having elasticity. Wherein said incident side micro-lens array and said emission side micro-lens array are held between said first and second light transmissible plates, and are elastically pressed by said first and second light transmissible plates.

In the tenth invention, optical part is used for projecting display image information displayed on a liquid crystal display element on a screen by use of a back light for lighting said liquid crystal display element. Said optical parts comprises said image forming unit comprising an incident side micro-lens array and a emission side micro-lens array, an enlarging unit having elasticity, and a light transmissible support plate having elasticity. Wherein said image forming unit is held between said enlarging unit and said light transmissible support plate, and are elastically pressed by said enlarging unit and said light transmissible support plate.

These and other objects, features and advantages of the invention will be apparent from the following more particular description of preferred embodiments of the invention, as illustrated in the accompanying drawings.

DESCRIPTION OF THE PREFERRED EMBODIMENTS

Preferred examples of the present invention will be described with reference to the drawings.

Figure 1:
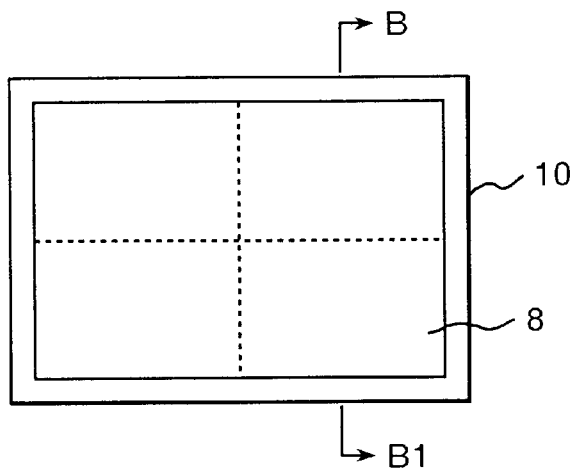
FIG. 1 is a plan view for illustrating one example of an image display apparatus in accordance with the present invention.
Figure 2:
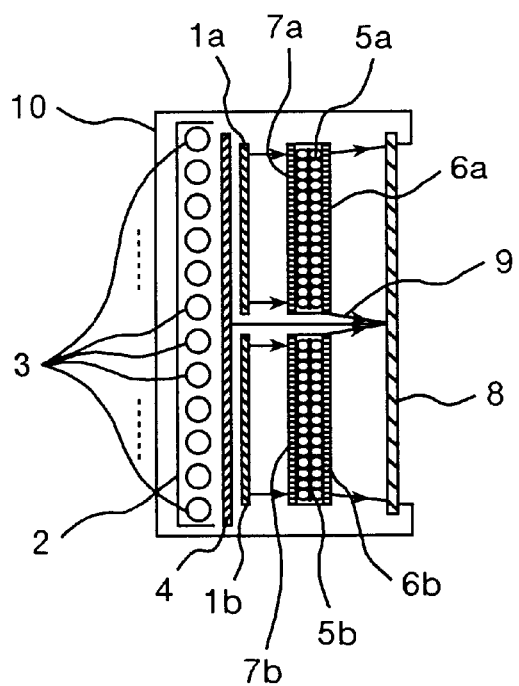
FIG. 2 is a cross sectional view along the line B–B1 of the image display apparatus shown in FIG. 1.

FIG. 1 is a plan view for illustrating an example of an image display apparatus in accordance with the present invention, and FIG. 2 is a vertical cross sectional view along the line B–B1 of the image display apparatus shown in FIG. 1. The image display apparatus shown in FIG. 1 and FIG. 2 can project the liquid crystal panel without seam. The image display apparatus which uses four liquid crystal display elements namely four element jointing is shown in FIG. 1 and FIG. 2 as an example, the present invention can be realized for the image display apparatus having any number of elements in vertical and horizontal direction.

In FIG. 1 and FIG. 2, $1a$ and $1b$ denote liquid crystal display elements, 2 denotes a back light for lighting these liquid crystal display elements $1a$ and $1b$, 3 denotes a cathode ray tube which is a component of the back light 2, and 4 denotes a means for narrowing the divergent angle of output light of the back light provided between the cathode ray tube 3 and the liquid crystal display elements $1a$ and $1b$, namely divergent angle control means. Numerals $5a$ and $5b$ denote image forming units for projecting displayed images on the liquid crystal display element $1a$ and $1b$ to form an erect real image, $6a$ and $6b$ denote enlarging units for enlarging an erect real image projected by the image forming units $5a$ and $5b$, and $7a$ and $7b$ denote light transmissible support plates, 8 denotes back projection type screen, 9 denotes a separation plate, and 10 denotes a chassis for containing these parts.

Next, the operation of respective component parts is described. The back light 2 lights the transmission type liquid crystal display elements $1a$ and $1b$ with the light emitted from the cathode ray tube 3 which is a component of the image display apparatus. However, the transmission type liquid crystal display elements 1a and 1b are involved in view angle problem, the contrast of the portion where the light is incident inclined at an angle larger than a certain angle is inverted. To cut needless light beam emitted from the back light 2, the divergent angle control means 4 for narrowing the divergent angle of the output light of the back light is provided between the back light 2 and the transmission type liquid crystal display elements 1a and 1b. As the divergent angle control means 4 for narrowing the output light of the back light 2, for example, a divergent angle control means which uses two thin elastic films having micro-prisms formed on one side and placed one on the other so that the prisms of the two films are positioned orthogonal as described in Japanese Unexamined Patent Publication No. Sho 60-70601 may be used. The use of the divergent angle control means 4 allows the divergent angle of the output light of the back light 2 to be limited within about ±30 degrees.

A display image displayed on the transmission type liquid crystal display elements 1a and 1b is projected on the back projection type screen 8 by the image forming unit to form an erect life-size image or erect real image. The display image projected by the image forming units 5a and 5b is enlarged by the enlarging units 6a and 6b to form an image on the back projection type screen 8. In the present example, concave Fresnel lenses are used as the enlarging units 6a and 6b. The structure of the image forming units 5a and 5b, light transmissible support plates 7a and 7b, and enlarging units 6a and 6b will be described hereinafter.

In the example of the present invention, adjacent images formed on the back projection type screen 8 are not overlapped. The separation plate 9 is provided so that the error due to fabrication accuracy and aging do not cause overlapping.

A plurality of projection units described herein above are arranged without seam between respective projection image on the back projection type screen 8, and a high resolution large screen image is thereby obtained.

Next, the structure of the image forming units 5a and 5b is described with reference to FIG. 3 and FIG. 4.

Figure 3:
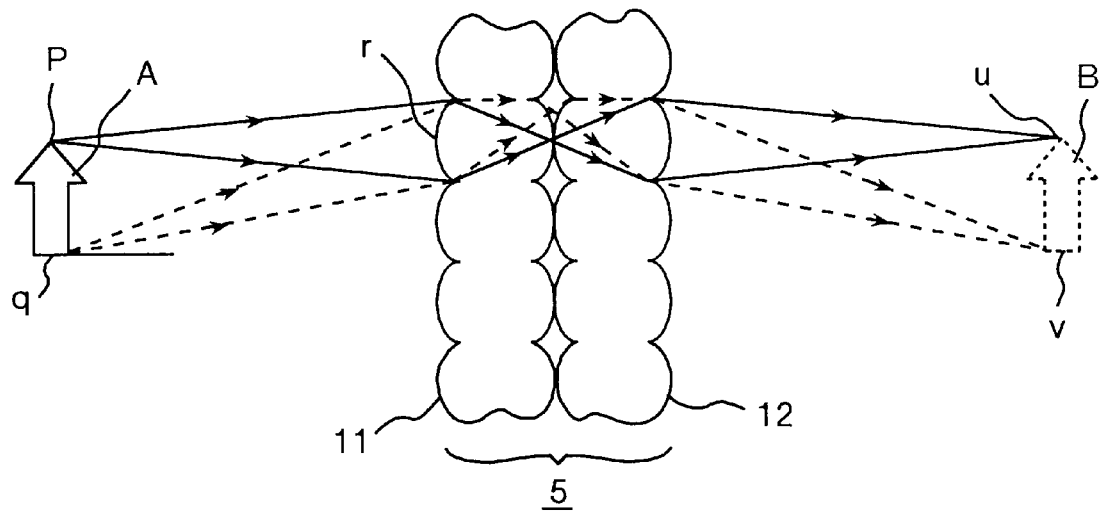
FIG. 3 is an enlarged side view for illustrating an example of an image forming unit in accordance with the present invention.

FIG. 3 is a side view for illustrating an example of an image forming unit in accordance with the present invention. In FIG. 3, 5 denote an image forming unit, 11 denotes an incident side micro-lens array which is a component of the image forming unit 5, and 12 denotes a emission side micro-lens array which is also a component of the image forming unit 5. The optical axes of respective lenses which are components of the incident side micro-lens 11 correspond to the optical axes of respective lenses which are components of the emission side micro-lens array 12 in one-to-one correspondence and the optical axes of both micro-lens arrays are coincident.

Figure 4:
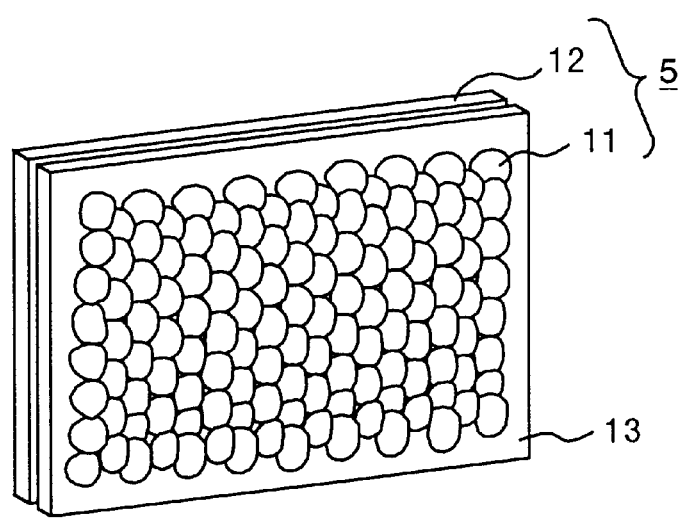
FIG. 4 is a perspective view of the image forming unit.

FIG. 4 is a perspective view of the image forming unit 5 from the left side of FIG. 3. In FIG. 4, the image forming unit 5 comprises the incident side micro-lens array 12 and the emission side micro-lens array 12, and 13 denotes the edge of the incident side micro-lens array 11.

In FIG. 3, the arrow A shows an image displayed on the liquid crystal display element 1 (not shown in the drawing), and the arrow B shows an erect life-size image or erect real image projected on the back projection type screen 8. When a lens 5 of the incident side micro-lens array 11 is addressed, the light which comes from the top end p of the image A proceeds on the path drawn with solid line in the drawing and reaches the top end u of the image B. Similarly, the light which comes from the bottom end q proceeds on the path drawn with broken line in the drawing and reaches the bottom end v of the image B.

The micro-lens arrays 11 and 12 are usually formed by means of injection molding as described herein above, the plate thickness is very thin in comparison with the outside dimension. For example, for the liquid crystal display element 1a and 1b having a width across corners of 14.1 inches and aspect ratio of 4:3, in the case that the distance between the liquid crystal display elements 1a and 1b and the incident side micro-lens array 11 is 30 mm and the light take-in angel is ±12 degrees, the outside dimension of the micro-lens arrays 11 and 12 is 15.3 inches (width across corners for aspect ratio 4:3) and the plate thickness (sag space of the lens portion is not included) is 1.6 mm according to the design by the inventors. Such thin large molded product is apt to warp.

Figure 5:
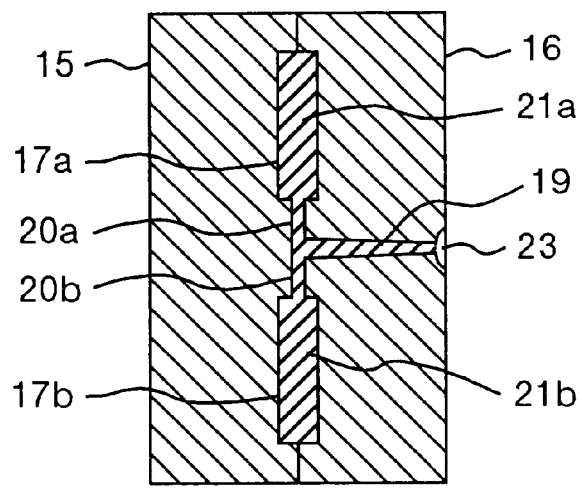
FIG. 5 is a cross sectional view for showing resin filled in a mold for manufacturing a micro-lens array.
Figure 6:
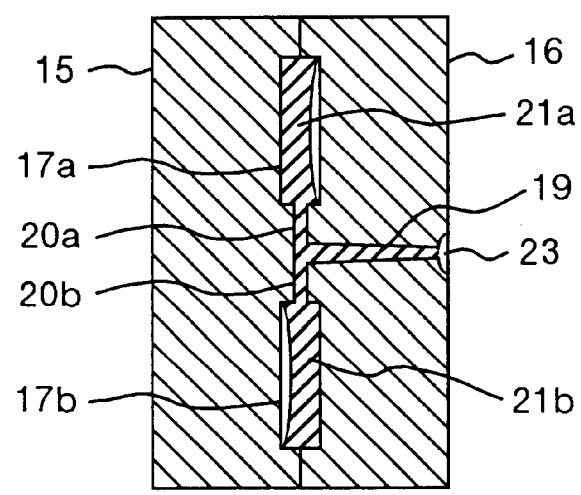
FIG. 6 is a cross sectional view for showing a molded product deformed in a mold.

The mechanism of warp deformation of a thin large molded product is described herein under with reference to FIG. 5 and FIG. 6.

Figure 15:
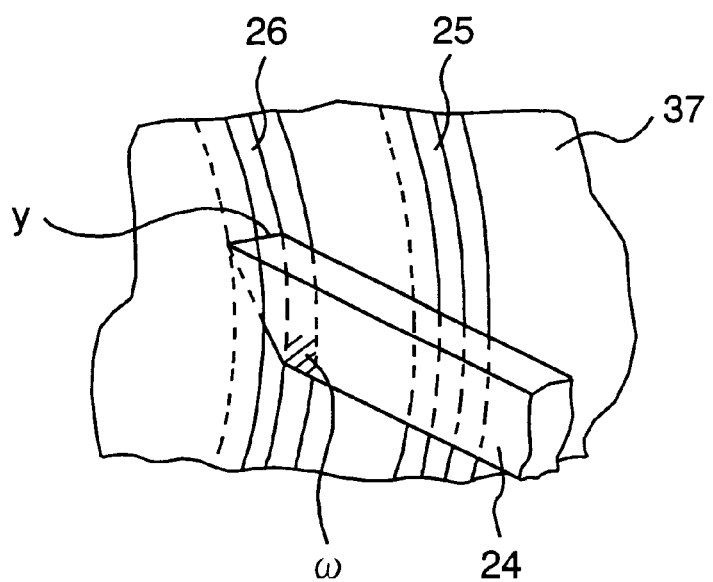
FIG. 15 is a front view for describing fabrication of a mold for molding a concave Fresnel lens having a Fresnel surface on the image forming unit side in accordance with the present invention.

FIG. 5 is a cross sectional view of resin filled in a mold for manufacturing an image forming element, and FIG. 6 is a cross sectional view for illustrating the resin shrink-deformed in the mold. In FIG. 5 and FIG. 6, 15 denotes the movable half of the mold, 16 denotes the front mold, 17a denotes the upper cavity, 17b denotes the lower cavity, 19 denotes a spool for injecting resin, 20a denotes the upper runner, 20b denotes the lower runner, 21a denotes resin material filled in the upper cavity 17a, and 21b denotes resin material filled in the lower cavity 17b. Resin material is injected from a bung hole 23, and filled in the upper cavity 17a and the lower cavity 17b respectively comprising the movable half of the mold 15 and front mold 16 through the spool 19, the upper runner 20a, and the lower runner 20b. FIG. 5 shows the filled resin after filling, the filled resin material is filled in the cavities 17a and 17b without space.

FIG. 6 shows the resin which has been cooled in the mold, the filled resin material 21a and 21b is shrink-deformed to result in mold release in the cavities 17a and 17b. The mold release in the mold is reflected as the warp deformation.

Similarly, when the micro-lens arrays 11 and 12 are molded in a mold, mold release occurs to cause warp deformation. The incident surface side and the emission surface side of the micro-lens arrays 11 and 12 to be molded are symmetrical, and in the case that the movable half of the mold 15 and front mold 16 are the same, which surface side goes into mold release is unknown. If mold release occurs in the inverse direction, the warp deformation of the molded product can not be controlled under this condition because the inverse warp deformation occurs.

Generally, to control the warp deformation of the molded product, a method in which the temperature of the movable half of mold 15 is differentiated from the temperature of the front mold 16 is known. However, in this method, the shrinkage of the incident surface side and the emission surface side of the micro-lens arrays 11 and 12 are differentiated each other, and the different shrinkage results in being uncoincident between the optical axis of the incident surface side micro-lens on the peripheral area and the optical axis of the emission surface side micro-lens on the peripheral area, therefore this method can not be applied. In the image forming units 5a and 5b in accordance with the present invention, the problem is solved by applying a structure described herein under.

First, the image forming units 5a and 5b are described.

Figure 7:
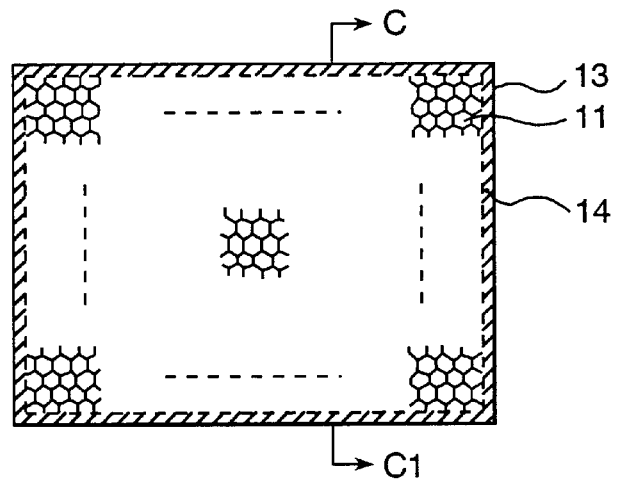
FIG. 7 is a front view for illustrating another example of an image forming unit in accordance with the present invention.
Figure 8:
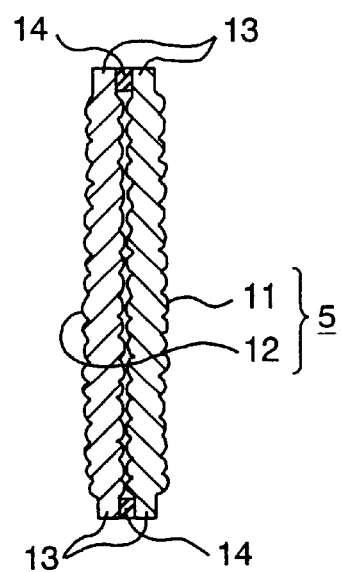
FIG. 8 is a cross sectional view along the line C–C1 of the image forming unit shown in FIG. 7.

FIG. 7 is a plain view for illustrating an example of a image forming unit in accordance with the present invention, FIG. 8 is a cross sectional view along the line C–C1 of the image forming unit shown in FIG. 7.

In FIG. 7 and FIG. 8, 5 denotes an image forming unit, 11 denotes an incident side micro-lens array which is a component of the image forming unit 5, 12 denotes a emission side micro-lens array which is a component of the image forming unit 5, 13 denotes edges of the incident side micro-lens array 11 and the emission side micro-lens array 12, and 14 denotes adhesive which adheres between the incident side micro-lens array 11 and the emission side micro-lens array 12 at the edge 13 portion.

When the edges 13 are adhered by an adhesive 14, it is required that the axis center of each lens which is a component of the incident side micro-lens array 11 and the emission side micro-lens array 12 is coincided each other and the adhesive is solidified as it is. Accordingly, it is required that the adhesive 14 used for this purpose does not function as adhesive during positioning work and functions as adhesive with some external effect after completion of the positioning. As the adhesive which is suitably used for this purpose, adhesives described herein under are used practically.

(1) Heat melting type film adhesive

The adhesive is an adhesive which is a solid in an ordinary temperature and converted to a liquid when heated. Adherents between which heat melting type film adhesive is held are free each other because the heat melting type film adhesive is a solid sheet in an ordinary temperature and not adherent. The method of use is described referring to an example of the present invention herein under.

An adhesive 14 is temporarily fixed on the edge 13 of the incident side micro-lens array 11, and next the emission side micro-lens array 12 is placed thereon and positioned, and then the adhesive 14 is heated externally through the edge 13 to melt the adhesive 14. The melting is completed and then the adhesive 14 is cooled for solidification, and thus the adhesion is completed. At that time, of course, the adhesive 14 having the melting point lower than those of the incident side micro-lens array 11 and the emission side micro-lens array 12 is selected.

(2) Photo-setting type adhesive

This type of adhesive is an adhesive which is a liquid in an ordinary temperature and hardened to form a solid by irradiating ultraviolet ray. Adherents between which photo-setting type adhesive is applied are free each other because the photo-setting type adhesive is a liquid in an ordinary temperature and does not exhibit adhesive action. The method of use is described referring to an example of the present invention herein under.

A liquid adhesive 14 is applied on the edge 13 of the incident side micro-lens array 11, next the emission side micro-lens array 12 is placed thereon and positioned, and then the adhesive 14 is irradiated externally with ultraviolet ray through the edge 13 to solidify the adhesive 14. Thus the adhesion is completed. At that time, of course, material which allows ultraviolet ray to transmit is selected as the material of the incident side micro-lens array 11 and the emission side micro-lens array 12.

(3) Ultrasonic melting adhesion

Ultrasonic melting adhesion is not an adhesive, and the present invention can be implemented by using this method. Ultrasonic melting adhesion is a technique in which a projection is provided on the adhesion surface of an adherent and the adhesion surfaces are faced with interposition of the projection and ultrasonic vibration is applied externally from an ultrasonic vibrator to melt the projection with vibrational energy and thus the adherents are adhered. The method of application is described referring to an example of the present invention herein under.

A projection (not shown in the drawing) is provided on the edge 13 of the incident side micro-lens array 11, next the emission side micro-lens array 12 is placed one on the other and positioned, and then vibration energy is added to the projection through the edge 13 from the ultrasonic vibrator to melt the projection, and thus the adherents are adhered.

In the present example, edges 13 of the incident side micro-lens array 11 and the emission side micro-lens array 12 are adhered by means of heat molting type film adhesive, photo-setting type adhesive, pressure sensitive adhesive, or ultrasonic melting adhesion. In the present invention, the term—adhesion—includes these adhesion, pressure sensitive adhesion, and melting adhesion. Also in claims, the term—adhesion—includes not only adhesion but also pressure sensitive adhesion and melting adhesion.

The image forming unit 5 comprising the incident side micro-lens array 11 and the emission side micro-lens array 12 combined together at the edge 13 portion as described herein above is advantageous as described herein under.

The effect of the image forming unit 5 of the present invention is described with reference to FIG. 9 and FIG. 10.

Figure 9:
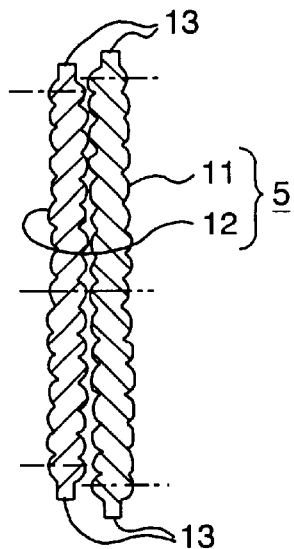
FIG. 9 is a cross sectional view for schematically illustrating the behavior due to temperature change in the case that the periphery of the image forming unit is not fixed with adhesive.
Figure 10:
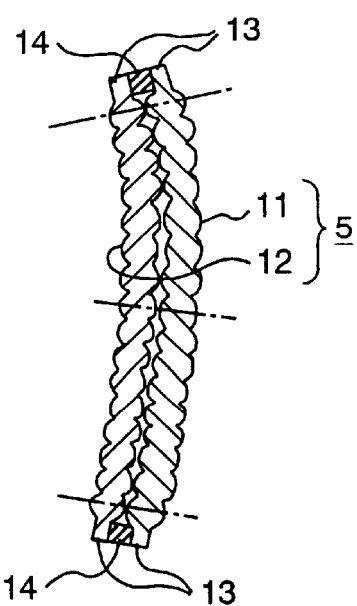
FIG. 10 is a cross sectional view for schematically illustrating the behavior due to temperature change in the case that the end of the image forming unit shown in FIG. 8 is adhered.

FIG. 9 is a cross sectional view of an image forming unit 5 which is not in accordance with the present invention, and FIG. 10 is a cross sectional view of an image forming unit 5 which is in accordance with the present invention. In FIG. 9 and FIG. 10, the same components as shown in FIG. 8 are given the same numbers as given in FIG. 8.

FIG. 9 schematically shows the incident side micro-lens array 11 and the emission side lens array 12 wherein the incident side micro-lens array 11 is heated when both the micro-lens arrays 11 and 12 are not adhered at the edge 13. As it is obvious from FIG. 9, the heated incident side micro-lens array 11 expands thermally to cause axis deviation of the incident side micro-lens array 11 from the emission side micro-lens array 12 on the peripheral areas.

Assuming that the lens pitch of the micro-lens array is 750 mm, the axis deviation allowance is 50 mm. If the linear thermal expansion coefficient of the micro-lens array material is 7E-5 cm/cm·° C., the temperature difference allowance of the 15.3 inch micro-lens array (width across corners with an aspect ratio 4:3) is as small as 4.8° C., and this value is practically problematic.

FIG. 10 schematically show the incident side micro-lens array 11 and the emission side lens array 12 wherein the incident side micro-lens array 11 is heated when both the micro-lens arrays 11 and 12 are adhered at the edge 13. As it is obvious from FIG. 10, the heated incident side micro-lens array 11 expands linearly, and warps to the emission side micro-lens array side. The incident side micro-lens array 11 and the emission side micro-lens array 12 are warped without deviation as shown in FIG. 9 because both the micro-lens arrays 11 and 12 are adhered at the edge 13. As shown in FIG. 10, the lens axial center of the incident side micro-lens array 11 and the emission side micro-lens array 12 is inclined but will not be deviated. In FIG. 10, significant warping is shown for the purpose of understanding, but for example, in the case of a 15.3 inch micro-lens array, the 10° C. temperature difference corresponds only to warping with a radius of curvature of 2000 mm or longer, and such warping is not practically problematic.

Next, the optical parts including the image forming unit in accordance with the present invention is described herein under.

Figure 11:
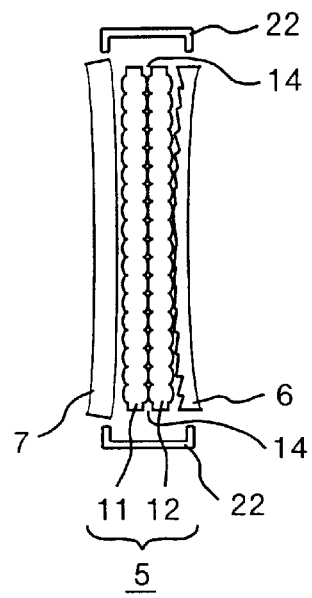
FIG. 11 is a side view for illustrating an example before fabrication of optical parts including an image forming unit in accordance with the present invention.
Figure 12:
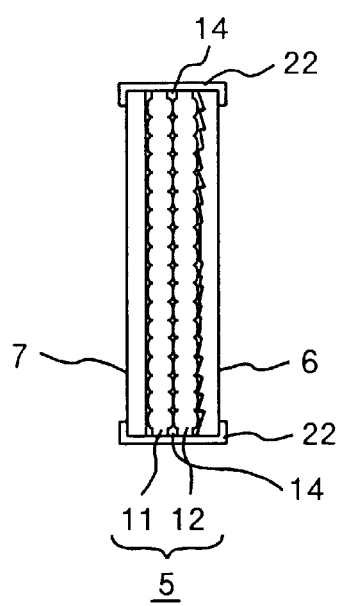
FIG. 12 is a side view for illustrating after fabrication of the optical parts including the image forming unit in accordance with the present invention.

FIG. 11 and FIG. 12 are side views for illustrating an example of optical parts including the image forming unit in accordance with the present invention, FIG. 11 shows the optical parts before fabrication and FIG. 12 shows the optical parts after fabrication. In FIG. 11 and FIG. 12, 5 denotes an image forming unit, 11 denotes an incident side micro-lens array which is a component of the image forming unit 5, 12 denotes a emission side micro-lens array which is a component of the image forming unit 5, 14 denotes adhesive for adhering between the incident side micro-lens array 11 and the emission side micro-lens array 12, 6 denotes an enlarging unit comprising a Fresnel lens which is warped convexly toward the image forming unit 5 side, 7 denotes a light transmissible support plate, preferably a light transmissible support plate which is warped convexly toward the image forming unit 5 side, and 22 denotes a U-shaped adapter.

The image forming unit 5 comprising the incident side micro-lens array 11 and the emission side micro-lens array 12, which are large thin-walled molded products, is placed between the light transmissible support plate 7 warped convexly toward the image forming unit 5 side and the enlarging unit 6 comprising a concave Fresnel lens warped convexly toward the image forming unit side. Because the light transmissible support plate 7 and the enlarging unit 6 are warped as shown in FIG. 11, the peripheries of the light transmissible support plate 7 and the enlarging unit 6 are inserted to the space of the U-shaped adapter as shown in FIG. 12 and both ends of the U-shaped adapter 22 are tightened to semi-fix these components, the image forming unit 5 is pressed on both sides, as the result the incident side micro-lens array 11 and the emission side micro-lens array 12, which are components of the image forming unit 5, are maintained in close contact each other regardless of initial warping direction.

In the present example, the light transmissible support plate 7, the image forming unit 5, and the enlarging unit 6 are semi-fixed by use of the U-shaped adapter 22, however the ends of the light transmissible support plate 7, the image forming unit 5, and the enlarging unit 6 may be adhered by applying adhesive on the ends or may be adhered by use of pressure sensitive adhesive such as double coated tape.

In the present invention, the term—fix—means fixing by use of adhesive or by means of ultrasonic melting adhesion, the term—semi-fix—means fixing by use of an adapter, clip, or bolt and nut as used in the present example, so that the light transmissible support plate 7, the image forming unit 5, and the enlarging unit 6 are separated without damage when these components are disassembled.

The enlarging unit 6 comprising concave Fresnel lens having Fresnel surface on both sides or having Fresnel surface on one side may be used in the present invention to exhibit the same effect. In the case that a Fresnel lens having Fresnel surface on one side is used, the Fresnel surface side is placed so as to be in contact with the image forming unit 5 in the present invention. Thereby both side surfaces of the fabricated parts shown in FIG. 12 are smooth surfaces, and the soil resistance is improved. The thickness and the warping magnitude of both the light transmissible support plate 7 and the enlarging unit 6 are approximately equal so that the fabricated parts shown in FIG. 12 is free from warping. The same material is used for the light transmissible support plate 7 and the enlarging unit 6 so that the fabricated parts shown in FIG. 12 is free from warping even when the temperature changes. When the humidity changes, the fabricated parts shown in FIG. 12 absorbs moisture from both sides, the light transmissible support plate 7 and the enlarging unit 6 warp in the direction opposite to the initial warp direction.

If the warping magnitude due to humidity exceeds the initial warping magnitude of the support plate 7 and the enlarging unit 6, the force which is pressing the incident side micro-lens array 11 against the emission side micro-lens array 12, which are components of the image forming unit 5, is released, a space is formed between the incident side micro-lens array 11 and the emission side micro-lens array 12, and as the result the resolution of the image forming unit 5 becomes poor. To prevent such problem, in the present invention, the light transmissible support plate 7 and the enlarging unit 6 are coated with moisture-proofing organic compound such as vinylidene chloride or moisture-proofing inorganic compound such as silicon dioxide. Otherwise, material which is less moisture absorptive than polymethylmethacrylate resin, for example, copolymer resin consisting of styrene and methacrylate, polyethyleneterephthalate resin, or polycarbonate resin may be used as the material of the light transmissible support plate 7 and the enlarging unit 6.

Next, the enlarging unit 6 comprising a concave Fresnel lens in accordance with the present invention is described herein under with reference to the drawings.

Figure 13:
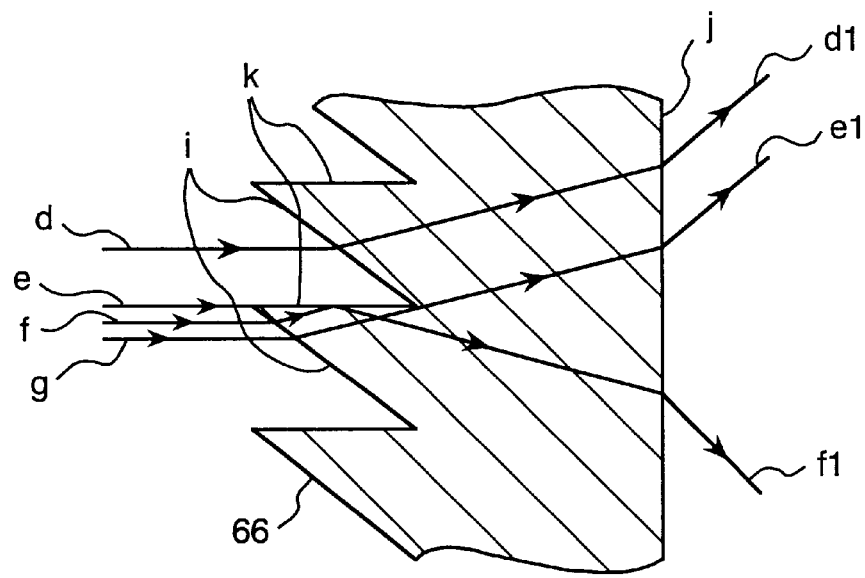
FIG. 13 is a cross sectional view for describing the generation mechanism of stray light in the case that a concave Fresnel lens having a Fresnel surface on the image forming unit side is used for an enlarging unit.
Figure 14:
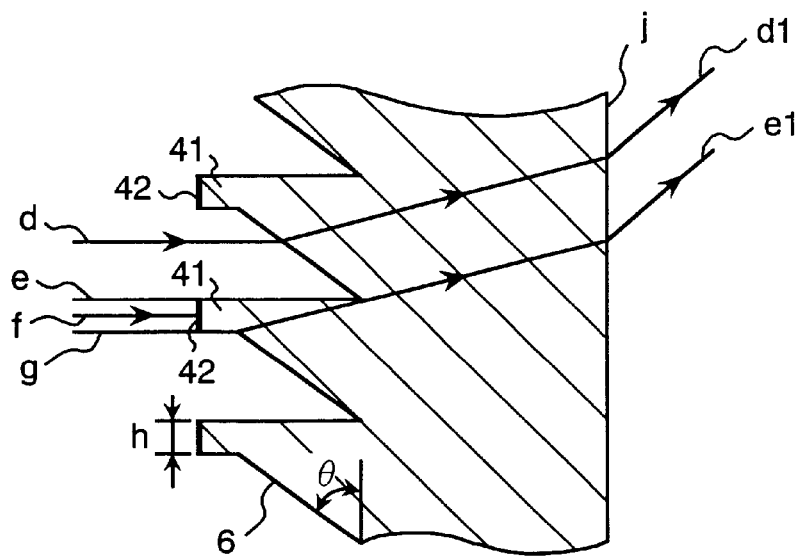
FIG. 14 is a cross sectional view of a concave Fresnel lens having a Fresnel surface on the image forming unit side in accordance with the present invention.

FIG. 13 is a cross sectional view of the concave Fresnel lens having a Fresnel surface on the light incident side and FIG. 14 is a cross sectional view of the concave Fresnel lens having a Fresnel surface on the light incident side in accordance with the present invention.

As described herein above, a concave Fresnel lens having a Fresnel surface only on one side is used as the component of the enlarging unit 6, the Fresnel lens is disposed so that the Fresnel surface is in contact with the image forming unit 5 in the present invention. However, in this case, the Fresnel lens is involved in a problem as described herein under. The problem is described with reference to FIG. 13.

The light beam d incident perpendicularly to the concave Fresnel lens 66 is refracted on the Fresnel surface i and refracted again on the going-out surface j, and gets out as the going-out light beam d1.

Similarly, the light beam e incident perpendicularly to the concave Fresnel lens 66 gets out as the going-out light beam e1, and the light beam d1 and the light beam e1 are parallel each other. However, the light beam f is refracted on the Fresnel surface i and then totally reflected on the Fresnel rising surface k, and refracted again on the going-out surface j and gets out as the going-out light beam f1. The light beam f1 is not parallel to the light beam d1 and the light beam e1. This phenomenon continues up to the light beam g, and causes a ghost (stray light) and makes the image quality poor.

FIG. 14 is a cross sectional view for illustrating an example of a concave Fresnel lens 6 having a Fresnel surface on the incident surface side of the light beam in accordance with the present invention. This Fresnel lens is different from the concave Fresnel lens 66 shown in FIG. 13 in that a projection 41 having a flat end is formed at the top of the Fresnel. On the top flat end of the projection 41, a shading portion 42 which is printed black for shading is provided. As the result, light beams d, e, and g which are incident perpendicularly to the concave Fresnel lens 6 proceeds through the same path as in the case of the concave Fresnel lens 66 shown in FIG. 13 and get out from the going-out surface j, the light beam f, which causes ghost (stray light) in the case of the concave Fresnel lens 66 shown in FIG. 13, is shaded by the shading portion 42 provided on the projection 41 having the top flat end provided on the top of the Fresnel, and does not get out from the going-out surface j as a ghost.

Next, the width h of the projection 41 is described. The Fresnel angle θ of the concave Fresnel lens 6 decreases with increasing distance from the periphery of the concave Fresnel lens 6 toward the center, therefore the range where the ghost appears decreases with increasing distance from the periphery toward the center, and becomes 0 at the center. The width h of the projection 41 may be the minimum size which does not cause the ghost, however, if this rule is applied without exception, the width h of the projection 41 should be nearly zero at the portion near the center of the concave Fresnel lens 6. However, it is very difficult to realize such projection configuration. To solve this problem, in the present invention, the width h of the projection 41 is constant from the periphery to the center, or is decreased up to the realizable limit width. In other words, if the uniform brightness distribution is desired as the image display apparatus, the width h of the projection 41 is constant from the periphery to the center, on the other hand, if more brightness on the center is desired as the image display apparatus, the width h of the projection 41 is decreased gradually from the periphery to the center up to the realizable limit width.

It is required to make a mold to realize a concave Fresnel lens 6 having the projection 41 in accordance with the present invention by means of molding.

FIG. 15 is a schematic view of a mold for molding a concave Fresnel lens having the projection in accordance with the present invention wherein grooves are being formed to realize the projection. In FIG. 15, 37 denotes a mold body, 24 denotes a cutting tool for cutting grooves, 25 denotes a groove after completion of cutting, and 26 denotes an inside groove which is now being cut. For cutting the mold 37, usually a cutting tool 24 is pressed against the rotating mold 37. The part of the cutting tool 24 which relates to cutting is the blade top y, other portion has the relief so as not to be brought into contact with the mold. However, when the groove 25 is cut and thereafter the inside groove 26 is to be cut, because the radius of curvature of the groove 26 is smaller than that of the groove 25, the outside relief surface w of the cutting tool 24 is brought into contact with the groove 26 during cutting to cause chatter or cause chipping of the cutting tool 24 in the worst case.

Therefore, it is impossible to cut grooves to realize the projection 41 at the portion near the center. Because a concave Fresnel lens 6 molded by use of the mold 37 does not have the projection 41 on the center area, an image display apparatus which uses such a concave Fresnel lens forms an image having the bright center area. To solve such problem, in the present invention, a light reduction filter, for example, ND filter is provided only on the center area where the projection can not be provided.

Figure 16:
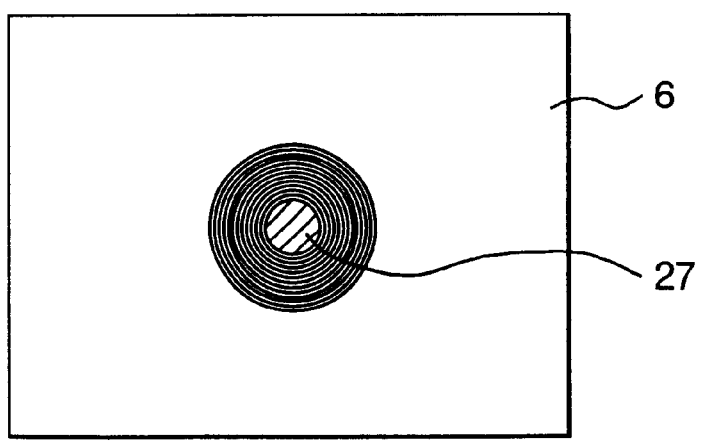
FIG. 16 is a front view of the concave Fresnel lens having a Fresnel surface on the image forming unit side in accordance with the present invention.

FIG. 16 is a front view for illustrating an example of a concave Fresnel lens having the projection in accordance with the present invention. Fresnel grooves and projections 41 are provided on the entire surface of the concave Fresnel lens 6, but are omitted excepting the center area in FIG. 16. In FIG. 16, 6 denotes a concave Fresnel lens having the projection 41, and 27 denotes a light reduction filter, for example, ND filter. The light reduction filter 27 is provided only on the center area of the concave Fresnel lens where the projection 41 is not provided. A plastic filter having adhesive which has been punched to form a piece of the desired size may be used conveniently as the light reduction filter 27. The density of the light reduction filter is prescribed so that the brightness is uniform when an image is projected by use of the concave Fresnel lens 6 having the projection 41.

In an example of the present invention, the parts comprising the image forming unit and the enlarging unit is described as the optical parts, however in the present invention, other light transmissible support plate may be provided instead of the enlarging unit. In this case, the optical part may be called as an image forming unit. It is required to provide an enlarging unit additionally to the other light transmissible support plate in the case that the other light transmissible support plate is provided. In the present invention, the term—optical parts including an image forming unit—means both the image forming unit itself and an image forming unit having an incorporated enlarging unit.

Next, another embodiment of the present invention is described with reference to FIG. 17, FIG. 18, and FIG. 19 for an example.

Figure 17:
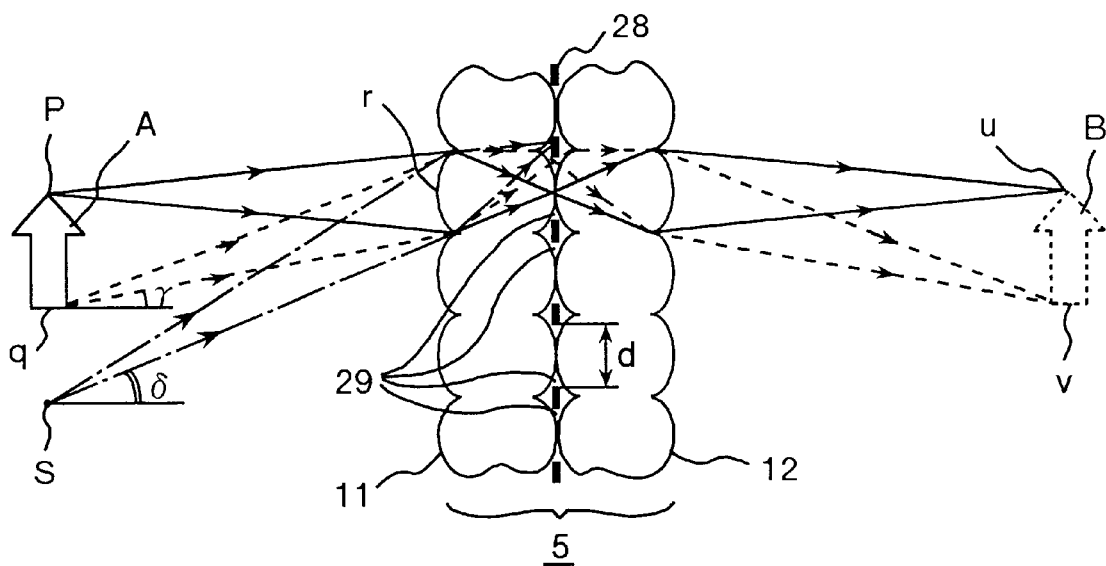
FIG. 17 is a side view for illustrating yet another example of an image forming unit in accordance with the present invention.

FIG. 17 is a side view for illustrating another example of an image forming unit in accordance with the present invention. In FIG. 17, 5 denotes an image forming unit, 11 denotes an incident side micro-lens array which is a component of the image forming unit 5, 12 denotes a emission side micro-lens array which is a component of the image forming unit 5, and 28 denotes a stop array provided between the incident side micro-lens array 11 and the emission side micro-lens array 12. The optical axis of each lens which is a component of the incident side micro-lens array 11 is one-to-one corresponding to the optical axis of each lens which is a component of the emission side micro-lens array 12, and both optical axes are coincident. A light passing portion 29 is provided on the step array 28, the light passing portion 29 is one-to-one corresponding to the optical axes of the incident side and emission side micro-lens arrays 11 and 12, and these are coincident.

Figure 18:
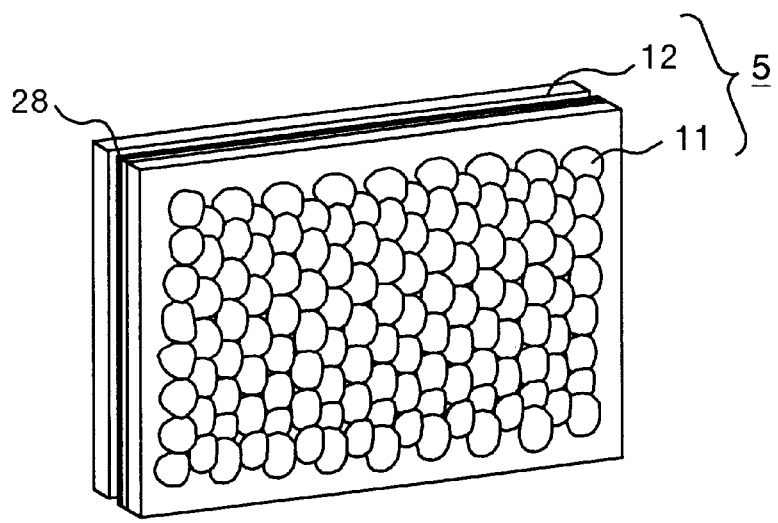
FIG. 18 is a perspective view when the image forming unit shown in FIG. 17 is viewed from the left side.

FIG. 18 is a perspective view of the image forming unit from the left side of FIG. 17. In FIG. 18, the incident side micro-lens array 11 is positioned in the front, the stop array 28 is positioned next, and the emission side micro-lens array 12 is positioned back. In FIG. 17, the arrow A indicates an image displayed on a liquid crystal display element 1 (not shown in the drawing), and the arrow B indicates an erect life-size image or erect real image projected on the back projection type screen 7 (not shown in the drawing). Addressing on a lens r of the incident side micro-lens array 11, the light which comes from the top end p of the image A proceeds on the path indicated by a solid line in the drawing and reaches the top end u of the image B. Similarly, the light which comes from the bottom end q of the image A proceeds on the path indicated by a broken line in the drawing and reaches the bottom end v of the image B. The angle made by the optical axis of the lens r and the light spot q is denoted by γ. The light which comes from the light point s which is positioned apart farther from the optical axis of the lens r proceeds on the path indicated by a chain line toward the lens r and is incident onto the lens r, but the light is shaded by the stop array 28 and can not reach the emission side micro-lens array 12. In this case, the angle made by the optical axis of the lens r and the light point s is denoted by δ. By controlling the diameter d of the light passing portion 29 of the step array 28, the light beam passing angle γ and the light beam shading angle δ are prescribed freely. These angles γ and δ are prescribed for the purpose described herein under.

In the present invention, as described hereinbefore, for example, two thin elastic films having formed micro-prisms on one side which are placed one on the other so that the prisms of these two films are disposed orthogonally is used as the divergent angle control means 4 (refer to FIG. 1) for narrowing the divergent angle of the output light of the back light 2. By using the divergent angle control means 4, the divergent angle of the output light of the back light 2 (refer to FIG. 1) can be controlled within ±30 degrees, this angle value is wider than the angle of the light transmissible cone disclosed in Fujitsu Giho (FUJITSU. 47, 4, (07, 1996), p355). It is usual that the wide divergent angle of the output light of the back light 2 results in poor image quality, however the wide angle as described herein above does not results in poor image quality in the present invention. The reason is that the light of wide divergent angle (angle δ) can be shaded by applying the present invention.

Figure 19:
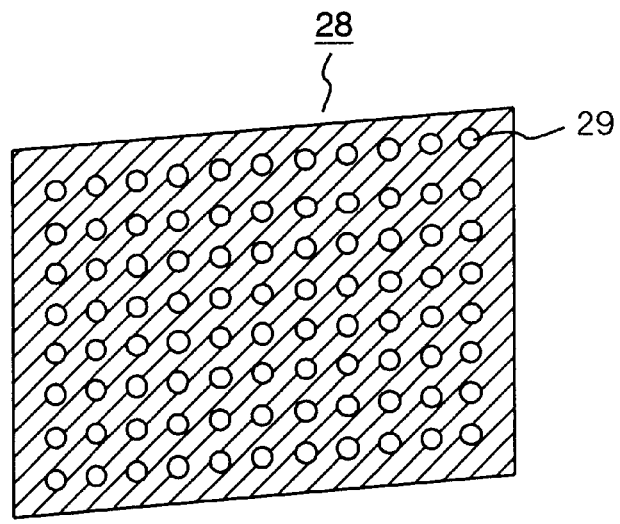
FIG. 19 is a perspective view for illustrating an example of a stop array in accordance with the present invention.
Figure 20:
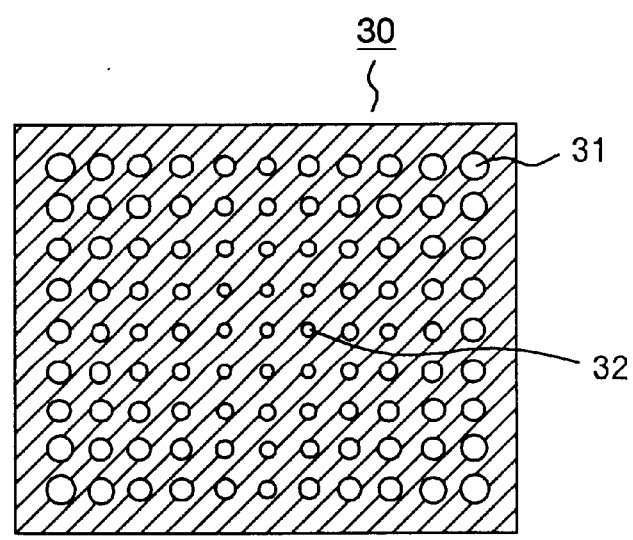
FIG. 20 is a plan view for illustrating another example of a stop array in accordance with the present invention.

FIG. 19 is a perspective view for illustrating an example of a stop array of an image forming unit in accordance with the present invention. In FIG. 19, the light passing portion 29 having the same diameter is provided on the stop array 28. FIG. 20 is a front view for illustrating another example of a step array of an image forming unit in accordance with the present invention. In FIG. 20, 30 denotes a step array, light passing portions 31 and 32 having different diameters are provided on the stop array 30. The light passing portion 31 on the peripheral area is larger than the light passing portion 32. The reason is that a display image projected by the image forming unit 5 is enlarged by an enlarging unit 6 to form an enlarged image on a back projection type screen 7, at that time the light is incident onto the back projection type screen 7 perpendicularly on the center area, on the other hand the light is incident onto the back projection type screen 7 with an angle on the peripheral area to result in poor brightness, and the larger light passing portion 31 is used to compensate the poor brightness. In the stop array 30 shown in FIG. 20, the diameter of the light passing portion may be increased gradually from the center area to the peripheral area, or may be increased stepwise from the center area to the peripheral area.

Stop arrays 28 and 30 shown in FIG. 19 and FIG. 20 respectively, in the case that the image forming unit 5 is subjected to small temperature and humidity change, may be made by etching a metal material, however in the case that the image forming unit 5 is subjected to large temperature and humidity change, may be preferably made of the same material as used for the micro-lens array which is a component of the image forming unit 5.

Figure 21:
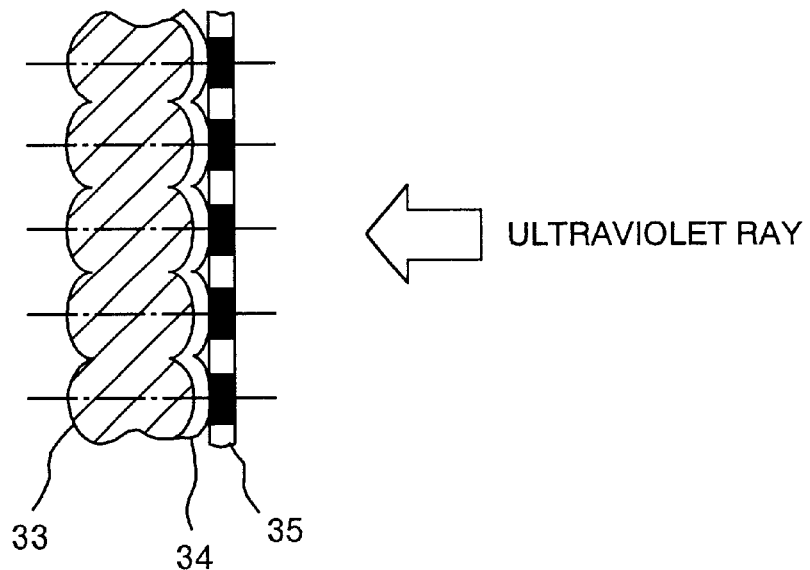
FIG. 21 is a cross sectional view for describing an example of a method for fabricating a micro-lens array having a stop array in accordance with the present invention.

FIG. 21 is a cross sectional view for illustrating yet another example of an image forming unit in accordance with the present invention. In FIG. 21, 33 denotes a micro-lens array, 34 denotes photoresist material coated on the surface of the micro-lens array 33, and 35 denotes a photomask, which is used in photomechanical process. Generally the photoresist material 34 is water soluble, and becomes water insoluble when irradiated with ultraviolet ray. As shown in FIG. 21, photoresist material 34 is coated on the micro-lens array 33, the stop pattern of the photomask 35 is brought into coincidence with the optical axis of the lens of the micro-lens array 33, and then the photomask 35 is brought into close contact with the micro-lens array 33. Next, ultraviolet ray is irradiated from the photomask side 35, the area of the photoresist material 34 excepting the area of stop pattern of the photomask 35 is exposed and washed with water. By applying the above-mentioned process, the area which is not exposed to ultraviolet ray is washed off, and the stop array 38 is formed on the micro-lens array 33.

Figure 22:
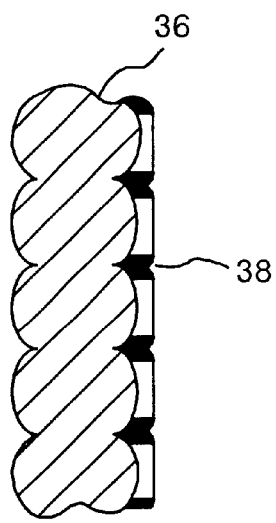
FIG. 22 is a cross sectional view for illustrating an example of a micro-lens array having a stop array in accordance with the present invention.
Figure 23:
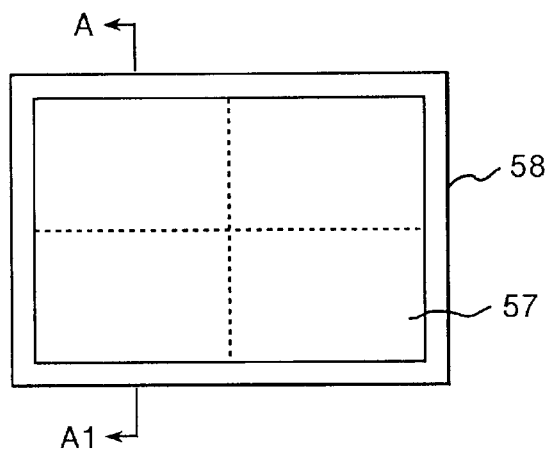
FIG. 23 is a plan view of an image display apparatus in association with the present invention.
Figure 24:
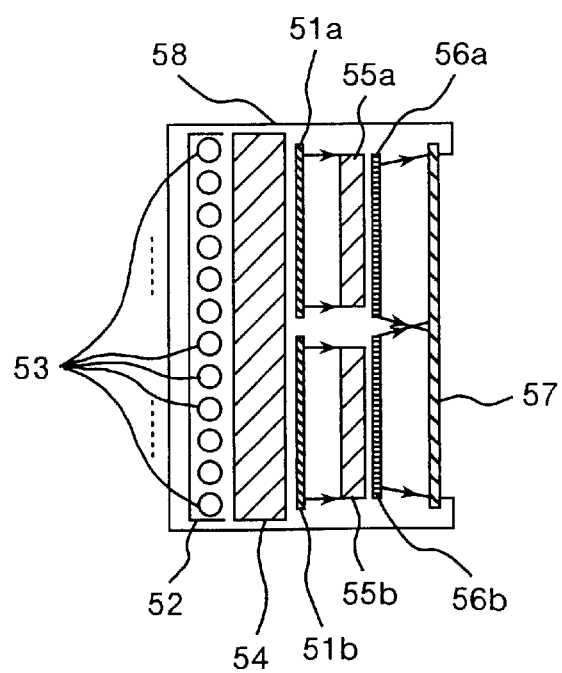
FIG. 24 is a side cross sectional view along the line A–A1 of the image display apparatus shown in FIG. 23.

FIG. 22 is an enlarged cross sectional view of the completed micro-lens array 36 having the stop array 38 made of photoresist material.

As described herein above, the divergent angle of the output light of the back light is about ±30 degrees in the case of the divergent angle control means comprising two thin elastic films having micro-prisms on one side which are placed on one the other so that the prisms are disposed orthogonally each other, and the divergent angle control means of wide divergent angle can be used according to the present invention.

For example, in the case that the output light of a back light with a divergent angle of about ±30 degrees is used and a conventional image forming unit is used, the divergent angle is too wide for a TFT liquid crystal and the contrast inversion occurs. Though the divergent angle of the output light of a back light can be limited to about ±30 degrees, it is the value at the brightness mesial magnitude, the light is scattered in wide angle at low brightness. The contrast inversion light is incident onto the micro-lens array with an angle larger than a certain prescribed angle. The light beam passes the farthest position apart from the optical axis of the lens between two micro-lens arrays. However, in the present invention, the light beam is cut by means of the stop arrays 28 and 30 provided between tow micro-lens arrays. As the result, an image display apparatus fabricated at a low fabrication cost and with a less number of parts which is significantly thinner than the conventional image display apparatus is provided.

According to the present invention, optical parts and an image display apparatus including an image forming unit comprising an incident side micro-lens array and emission side micro-lens array, which are thin walled large size molded products, for correcting deformation due to mold release are provided.

Furthermore, optical parts and an image display apparatus comprising incident side and emission side micro-lens arrays having micro-lenses are obtained, wherein the micro-lens arrays are always in close contact each other without separation and the optical axis of each micro-lens will not be uncoincident even when the temperature or humidity changes.

Because an image forming unit of an example of the present invention cuts the needless light beam emitted from the back light, a component having the simple structure that two thin elastic films having micro-prisms formed on one side is placed one on the other orthogonally can be used without deterioration of image quality as the divergent angle control means for narrowing the divergent angle of the output light provided between a back light and a transmission type liquid crystal display element. In other words, a divergent angle control means of a somewhat wide divergent angle may be used.

By using a stop array having light passing portions with a larger diameter on the peripheral area and with a smaller diameter on the center area, the poor brightness on the peripheral area due to inclined light beam incidence onto a back projection type screen is corrected.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image display apparatus comprising a transmission type liquid crystal display element, a back light for lighting said liquid crystal display element, optical parts including an image forming unit for projecting display image information on said liquid crystal display element, and a back projection type screen for displaying a projection image, said optical parts comprising an incident side micro-lens array, a emission side micro-lens array, a first light transmissible plate warped convexly toward said incident side micro-lens array, and the second light transmissible plate warped convexly toward said emission side micro-lens array, wherein said incident side micro-lens array and said emission side micro-lens array are held between said first and second light transmissible plates, and ends of these components are fixed or semi-fixed together.

2. The image display apparatus according to claim 1, wherein peripheries of said incident side micro-lens array and said emission side micro-lens array are adhered.

3. The image display apparatus according to claim 1, wherein said second light transmissible plate is an enlarging unit.

4. The image display apparatus according to claim 3, wherein said enlarging unit is a concave Fresnel lens 5.

5. The image display apparatus according to claim 4, wherein said concave Fresnel lens is coated with moisture proofing material.

6. The image display apparatus according to claim 4, wherein said concave Fresnel lens consists of a material which is less water absorptive than polymethylmethacrylate resin.

7. The image display apparatus according to claim 4, wherein said concave Fresnel lens is disposed so that the Fresnel surface is in contact with said emission side micro-lens array.

8. The image display apparatus according to claim 1, wherein a U-shaped adapter is provided, ends of said incident side micro-lens array, said emission side micro-lens array, said first light transmissible plate, and said second light transmissible plate are inserted into the space of said U-shaped adapter and tightened at the both ends of said U-shaped adapter to semi-fix with said adapter.

9. The image display apparatus according to claim 1, wherein ends of said incident side micro-lens array, said emission side micro-lens array, and said first and said second light transmissible plates are adhered or pressure sensitively adhered.

10. The image display apparatus according to claim 1, wherein the plate thickness of said first and second light transmissible plates is equal.

11. The image display apparatus according to claim 1, wherein said first and second light transmissible plates consist of the same material.

12. The image display apparatus according to claim 1, wherein the warping magnitude of said first and second light transmissible plates is approximately equal.

13. The image display apparatus according to claim 1, wherein a stop array is provided between said incident side micro-lens array and said emission side micro-lens array.

14. The image display apparatus according to claim 13, wherein said stop array is a shading plate having a plurality of light passing portions.

15. An image display apparatus comprising a transmission type liquid crystal display element, a back light for lighting said liquid crystal display element, optical parts including an image forming unit for projecting display image information on said liquid crystal display element, and a back projection type screen for displaying a projection image, said optical parts comprising said image forming unit comprising an incident side micro-lens array and a emission side micro-lens array, an enlarging unit warped convexly toward said image forming unit side, and a light transmissible support plate warped convexly toward said image forming unit side, wherein said image forming unit is held between said enlarging unit warped convexly toward said image forming unit side and said light transmissible support plate warped convexly toward said image forming unit side, and the peripheries of said enlarging unit and said light transmissible support plate are fixed or semi-fixed.

16. Optical parts used for projecting display image information displayed on a liquid crystal display element on a screen by use of a back light for lighting said liquid crystal display element, said optical parts comprising an incident side micro-lens array, a emission side micro-lens array, a first light transmissible plate warped convexly toward said incident side micro-lens array side, and a second light transmissible plate warped convexly toward said emission side micro-lens array, wherein said incident side micro-lens array and said emission side micro-lens array are held between said first and second light transmissible plates, and edges of these components are fixed or semi-fixed.

17. Optical parts according to claim 16, wherein said incident side micro-lens array and said emission side micro-lens array are adhered at the peripheries of said incident side and emission side micro-lens arrays.

18. Optical parts according to claim 16, wherein said second light transmissible plate is an enlarging unit.

19. Optical parts according to claim 18, wherein said enlarging unit is a concave Fresnel lens.

20. Optical parts according to claim 19, wherein said concave Fresnel lens is coated with moisture proofing material.

21. Optical parts according to claim 18, wherein said concave Fresnel lens consists of a material which is less water absorptive than polymethylmethacrylate resin.

22. Optical parts according to claim 19, wherein said concave Fresnel lens is disposed so that the Fresnel surface is in contact with said emission side micro-lens array.

23. optical parts according to claim 16, wherein a U-shaped adapter is provided, ends of said incident side micro-lens array, said emission side micro-lens array, said first light transmissible plate, and said second light transmissible plate are inserted into the space of said U-shaped adapter and tightened at the both ends of said U-shaped adapter to semi-fix with said adapter.

24. Optical parts according to claim 16, wherein ends of said incident side micro-lens array, said emission side micro-lens array, and said first and said second light transmissible plates are adhered or pressure sensitively adhered.

25. Optical parts according to claim 16, wherein the plate thickness of said first and second light transmissible plates is equal.

26. Optical parts according to claim 16, wherein said first and second light transmissible plates consist of the same material.

27. Optical parts according to claim 16, wherein the warping magnitude of said first and second light transmissible plates is approximately equal.

28. Optical parts according to claim 16, wherein a stop array is provided between said incident side micro-lens array and said emission side micro-lens array.

29. Optical parts according to claim 28, wherein said stop array is a shading plate having a plurality of light passing portions.

30. Optical parts used for projecting display image information displayed on a liquid crystal display element on a screen by use of a back light for lighting said liquid crystal display element, said optical parts comprising said image forming unit comprising an incident side micro-lens array and a emission side micro-lens array, an enlarging unit warped convexly toward said image forming unit side, and a light transmissible support plate warped convexly toward said image forming unit side, wherein said image forming unit is held between said enlarging unit warped convexly toward said image forming unit side and said light transmissible support plate warped convexly toward said image forming unit side, and the peripheries of said enlarging unit and said light transmissible support plate are fixed or semi-fixed.

31. An image display apparatus comprising a transmission type liquid crystal display element, a back light for lighting said liquid crystal display element, optical parts including an image forming unit for projecting display image information on said liquid crystal display element, and a back projection type screen for displaying a projection image, said optical parts comprising an incident side micro-lens array, a emission side micro-lens array, a first light transmissible plate having elasticity, and the second light transmissible plate having elasticity, wherein said incident side micro-lens array and said emission side micro-lens array are held between said first and second light transmissible plates, and are elastically pressed by said first and second light transmissible plates.

32. An image display apparatus comprising a transmission type liquid crystal display element, a back light for lighting said liquid crystal display element, optical parts including an image forming unit for projecting display image information on said liquid crystal display element, and a back projection type screen for displaying a projection image, said optical parts comprising said image forming unit comprising an incident side micro-lens array and a emission side micro-lens array, an enlarging unit having elasticity, and a light transmissible support plate having elasticity, wherein said image forming unit is held between said enlarging unit and said light transmissible support plate, and is elastically pressed by said enlarging unit and said light transmissible support plate.

33. Optical parts used for projecting display image information displayed on a liquid crystal display element on a screen by use of a back light for lighting said liquid crystal display element, said optical parts comprising an incident side micro-lens array, a emission side micro-lens array, a first light transmissible plate having elasticity, and a second light transmissible plate having elasticity, wherein said incident side micro-lens array and said emission side micro-lens array are held between said first and second light transmissible plates, and are elastically pressed by said first and second light transmissible plates.

34. Optical parts used for projecting display image information displayed on a liquid crystal display element on a screen by use of a back light for lighting said liquid crystal display element, said optical parts comprising said image forming unit comprising an incident side micro-lens array and a emission side micro-lens array, an enlarging unit having elasticity, and a light transmissible support plate having elasticity, wherein said image forming unit is held between said enlarging unit and said light transmissible support plate, and are elastically pressed by said enlarging unit and said light transmissible support plate.

* * * * *